US012198559B2

(12) United States Patent
Labreuche et al.

(10) Patent No.: US 12,198,559 B2
(45) Date of Patent: Jan. 14, 2025

(54) METHOD AND DEVICE FOR SUPERVISING A TRAFFIC CONTROL SYSTEM

(71) Applicant: THALES, Courbevoie (FR)

(72) Inventors: Christophe Labreuche, Palaiseau (FR); Nicolas Honore, Rungis (FR); Roman Bresson, Palaiseau (FR); Hélène Mertz, Rungis (FR); Simon Grah, Palaiseau (FR); Vincent Thouvenot, Genevilliers (FR)

(73) Assignee: THALES, Courbevoie (FR)

( * ) Notice: Subject to any disclaimer, the term of this patent is extended or adjusted under 35 U.S.C. 154(b) by 205 days.

(21) Appl. No.: 17/787,557

(22) PCT Filed: Dec. 11, 2020

(86) PCT No.: PCT/EP2020/085841
§ 371 (c)(1),
(2) Date: Jun. 20, 2022

(87) PCT Pub. No.: WO2021/122397
PCT Pub. Date: Jun. 24, 2021

(65) Prior Publication Data
US 2022/0406199 A1 Dec. 22, 2022

(30) Foreign Application Priority Data
Dec. 20, 2019 (FR) ........................................ 1915153

(51) Int. Cl.
*G08G 5/00* (2006.01)
(52) U.S. Cl.
CPC ......... *G08G 5/0043* (2013.01); *G08G 5/0017* (2013.01)

(58) Field of Classification Search
CPC ............... G08G 5/0043; G08G 5/0017; G08G 5/0021; G08G 5/0026; G08G 5/0052; G08G 5/0078; G06N 20/00; G06F 17/17
See application file for complete search history.

(56) References Cited

U.S. PATENT DOCUMENTS 10,810,892 B2 * 10/2020 Kalyan ................ G08G 5/0026

FOREIGN PATENT DOCUMENTS

FR    3 079 637 A1    10/2019

OTHER PUBLICATIONS

Li et al., "Risk management based on fuzzy measure and integral: an application to air traffic control management", Operations Research and Management Science, p. 153-157, 2014.

(Continued)

*Primary Examiner* — Rodney A Butler
(74) *Attorney, Agent, or Firm* — BakerHostetler

(57) ABSTRACT

A method for supervising an air traffic tracking system that includes determining performance indicator values and an operating feature of the tracking system for the current situation on the basis of the performance indicator values; if the operating feature is representative of an operating abnormality of the tracking system, determining at least one performance indicator corresponding to the operating abnormality, and determining values of the at least one performance indicator corresponding to normal operation; determining at least one quality of service measure of the tracking system based on the performance indicator values; if the at least one quality of service measure is representative of a degradation in the quality of service, determining at least one performance indicator corresponding to the degradation in the quality of service; executing at least one evaluation process associated with the at least one performance indicator and/or to the degradation in the quality of service.

16 Claims, 2 Drawing Sheets

(56) References Cited

OTHER PUBLICATIONS

Custinne, et al., "Surveillance chain performance assessment against ESASSP", 2014 Tyrrhenian International Workshop on Digital Communications—Enhanced Surveillance of Aircraft and Vehicles (TIWDC/ESAV), pp. 12-16, 2014.

Li, et al., "Comprehensive Risk Assessment Based on the Choquet Integral", The International Journal of Organization Innovation, vol. 11, No. 1, 2018.

Ozdemir, et al., "Aircraft selection using fuzzy ANP and the generalized choquet integral method: The Turkish airlines case", Journal of Intelligent and Fuzzy Systems, NL, vol. 31, No. 1, 2016.

Abichou, et al., "Choquet integral capacities-based data fusion for system health monitoring", IFAC Proceedings, vol. 45, Issue 20, pp. 31-36, Jan. 2012.

Eurocontrol Specification for ATM Surveillance System Performance, vol. 1, Edition: 1.1, ISBN: 978-2-87497-022-1, Sep. 2015.

Eurocontrol Specification for ATM Surveillance System Performance, vol. 2 Appendices, Edition: 1.1, ISBN: 978-2-87497-022-1, Sep. 2015.

Draft Eurocontrol Specification for ATM Surveillance System Performance, Edition 1.0, European Organisation for the Safety of Air Navigation, Mar. 2012.

Résumé of the Workshop, Stakeholder Consultation Workshop on the Draft Eurocontrol Specifications for ATM Surveillance System Performance (ESASSP) (ENPRM11-005), Feb. 2012.

Eurocontrol Specification for ATM Surveillance System Performance Summary of Responses Document ENPRM/11-005/SPEC/SOR/1.0, Annex A.

Eurocontrol Specification for ATM Surveillance System Performance Summary of Responses Document ENPRM/11-005/SPEC/SOR/1.0. Annex B.

Formal Consultation Distribution List State Key Stakeholder—Official Contact Points, Enclosure 3.

Eurocontrol Specification for ATM Surveillance System Performance, vol. 1, Edition: 1.2, 2021.

Eurocontrol Specification for ATM Surveillance System Performance, vol. 1, Edition 1.0, ISBN: 978-2-87497-022-1, 2012.

Eurocontrol Specification for ATM Surveillance System Performance, vol. 2 Appendices, Edition 1.0, ISBN: 978-2-87497-022-1, 2012.

Eurocontrol Specification for ATM Surveillance System Performance, vol. 2 Appendices, Edition 1.2, 2021.

Eurocontrol Specification for ATM Surveillance System Performance, European Organisation for the Safety of Air Navigation, Enclosure 1, Edition 0.35, 2011.

\* cited by examiner

METHOD AND DEVICE FOR SUPERVISING A TRAFFIC CONTROL SYSTEM

CROSS-REFERENCE TO RELATED APPLICATIONS

This application is a National Stage of International patent application PCT/EP2020/085841, filed on Dec. 11, 2020, which claims priority to foreign French patent application No. FR 1915153, filed on Dec. 20, 2019, the disclosures of which are incorporated by reference in their entirety.

FIELD OF THE INVENTION

The invention relates in general to tracking systems, and in particular to a method and a device for supervising an air traffic tracking system.

BACKGROUND

Air traffic tracking systems are conventionally used to manage air traffic and ensure the safety thereof while at the same time guaranteeing minimum safety distances between aircraft in order to avoid collisions.

A tracking system makes it possible to depict a real-time situation of the position of airplanes and their speed vectors.

An air traffic control system is based on interactions between air traffic controllers, technical supervisors and the system. Air traffic controllers guarantee safety distances between aircraft in the airspace of their sectors. Technical supervisors monitor the correct operation of the air traffic control system. However, when the air traffic controller observes a degradation of the tracking system, the technical supervisor is often not able to identify the origin of this degradation or to rectify it. Conversely, when the technical supervisor observes technical issues, he is not necessarily able to determine the operational impact of these technical issues for the air traffic controller.

At present, causes generating a deterioration in the quality of a tracking system are identified a posteriori. Thus, when the air traffic controller observes a major problem, analysis is carried out by an expert in order to identify the causes of this problem. The expert's analysis is lengthy and is based on quality of service indicators and requirements specified by the ESASSP standard (acronym for "EUROCONTROL Specification for ATM Surveillance System Performance"), which is defined in the document "EUROCONTROL Specification for ATM Surveillance System Performance, volume 1, ISBN: 978-287497-022-1, March 2012". The a posteriori analysis makes it possible to evaluate the compliance of the tracking system with the constraints and requirements specified by the ESASSP standard, as proposed for example in French patent application No. FR1800249.

The a posteriori analysis makes it possible to measure the tracking quality against a set of performance indicators and mandatory and/or recommended requirements. However, such an approach does not make it possible to identify and explain the origin of a potential degradation in the quality of service of the tracking system or of a possible malfunction of the tracking system.

There is therefore a need for an improved method and device for supervising an air traffic tracking system.

SUMMARY OF THE INVENTION

The invention aims to improve the situation. To this end, the invention proposes a method for supervising a tracking system capable of evaluating and providing analysis information relating to the operation and the quality of service of an air traffic tracking system, in a current situation of the tracking system as defined by the position and the speed vector of at least one aircraft moving in an airspace, the position and the speed vector being determined based on data from one or more sensors.

The method comprises a step of determining performance indicator values representing the current situation, the method being characterized in that it comprises the steps of:
  determining an operating feature of the tracking system for the current situation on the basis of the performance indicator values;
  if the operating feature is representative of an operating abnormality of the tracking system, determining at least one performance indicator corresponding to the operating abnormality, and determining values of said at least one performance indicator corresponding to normal operation;
  determining at least one quality of service measure of the tracking system for the current situation based on the performance indicator values representing the current situation;
  if said at least one quality of service measure is representative of a degradation in the quality of service, determining at least one performance indicator corresponding to said degradation in the quality of service;
  executing at least one evaluation process associated with said at least one performance indicator corresponding to said operating abnormality and/or to said degradation in the quality of service.

According to some embodiments, the operating feature may be a state chosen from the group comprising a normal operating state, at least one known abnormal operating state, an unknown abnormal operating state, and an impossible operating state, the operating feature being associated with an operating abnormality of the tracking system if said operating feature is not a normal operating state.

According to some embodiments, the normal operating state may correspond to a known situation for a given configuration, the given configuration corresponding to a first configuration in which said at least one aircraft is cruising or to a second configuration in which said at least one aircraft is approaching a given airport associated with a given positioning of one or more sensors and with a given type of weather for said given airport, said at least one known abnormal operating state being predefined, the impossible operating state corresponding to impossible combinations of the performance indicator values.

According to some embodiments, the step of determining performance indicator values representing the current situation may comprise partitioning the space of the performance indicator values into a plurality of areas comprising at least one normality area and at least one known abnormality area, each area of the plurality of areas representing a normality class and being associated with an operating state of the tracking system, said at least one normality area being associated with the normal operating state, each of said at least one known abnormality areas being associated with a known abnormal operating state.

According to some embodiments, partitioning the space of the performance indicator values may comprise determining said at least one normality area, based on standard data corresponding to performance indicator values obtained in normal operating situations, by applying an unsupervised machine learning technique.

According to some embodiments, the unsupervised machine learning technique may be chosen from a group comprising linear dimensionality reduction techniques, non-linear dimensionality reduction techniques, partitioning techniques and kernel methods.

According to some embodiments, the step of determining performance indicator values representing the current situation may comprise determining a set of data based on the standard data and partitioning the set of data into subsets by applying a supervised learning method, each subset corresponding to performance indicator values representing a known abnormality area.

According to some embodiments, the supervised learning method may be a data classification method.

According to some embodiments, a quality of service measure may correspond to multi-sensor tracking or single-sensor tracking, the quality of service measure corresponding to the overall tracking quality for a plurality of sensors for multi-sensor tracking, and to the tracking quality for a given sensor for single-sensor tracking.

According to some embodiments, the performance indicator values for the current situation may be contained within a normality class corresponding to the operating feature of the tracking system for the current situation, a quality of service measure of the tracking system being determined on the basis of said normality class.

According to some embodiments, the tracking system may be used to track said at least one aircraft in an airspace divided into a plurality of spatial areas, a quality of service measure of the tracking system being determined in association with each of the plurality of spatial areas.

According to some embodiments, the performance indicator values may have at least one missing value, a quality of service measure of the tracking system being determined in the presence of at least one missing performance indicator value.

According to some embodiments, the step of determining a performance indicator corresponding to the degradation in the quality of service may comprise determining an influence indicator associated with each performance indicator.

According to some embodiments, each performance indicator may be associated with a set of executable evaluation processes for evaluating the state of a subsystem of the tracking system, the step of executing at least one evaluation process comprising executing the evaluation processes associated with said at least one performance indicator corresponding to the operating abnormality of the tracking system and/or with said at least one performance indicator corresponding to the degradation in the quality of service.

The invention furthermore provides a device for supervising an air traffic tracking system, in a current situation of the tracking system as defined by a position and a speed vector relating to at least one aircraft, the position and the speed vector being determined based on data from one or more sensors, the device being configured to determine performance indicator values representing the current situation. The device is configured to:
  determine an operating feature of the tracking system for the current situation based on the performance indicator values;
  if the operating feature is representative of an operating abnormality of the tracking system, determine at least one performance indicator corresponding to the operating abnormality, and determine values of said at least one performance indicator corresponding to normal operation;
  determine at least one quality of service measure of the tracking system for the current situation based on the performance indicator values representing the current situation;
  if said at least one quality of service measure is representative of a degradation in the quality of service, determine at least one performance indicator corresponding to said degradation in the quality of service;
  execute at least one evaluation process associated with said at least one performance indicator corresponding to said operating abnormality and/or to said degradation in the quality of service.

Advantageously, the embodiments of the invention provide dual analysis of performance indicators computed in almost real time, making it possible to evaluate both the operating normality of a tracking system in a given situation and its conformity and its quality of service.

Advantageously, the embodiments of the invention make it possible to identify abnormal operation of the tracking system based on data flows generated in real time by way of unsupervised or semi-supervised machine learning techniques and to generate an explanation in the event of abnormal operation, the explanation identifying the features and the performance indicators explaining the detected operating abnormality.

Advantageously, the embodiments of the invention make it possible to identify a degradation in the quality of service by way of supervised machine learning techniques and to generate an explanation in the event of a degradation in the quality of service of the tracking system, the explanation for the degradation in the quality of service identifying the indicators explaining the degradation in the quality of service.

Advantageously, the embodiments of the invention make it possible to identify the root causes of an operating abnormality and degradation in the quality of service at the level of the performance indicators and at the level of the possible maintenance actions for a maintenance operator.

Advantageously, the embodiments of the invention provide monitoring tools to the technical supervisor of an air traffic tracking system allowing him to follow the evolution of the quality of service and to assess the operational impact of technical issues on the quality of service of the tracking system.

Advantageously, the embodiments of the invention make it possible to link the measure of the operational impact to the input data in order to allow the technical supervisor to identify the root causes of a possible degradation in the quality of service and to have an explanation about the provided quality of service information.

Advantageously, the joint use of supervised data (data tagged by an expert) and unsupervised data (data flows generated by the sensors of a tracking system) makes it possible to characterize normal operating states and operating states corresponding to anomalies, to detect abnormal situations and to refine the model for evaluating the quality of service using unsupervised data.

Advantageously, the explanation algorithms according to the embodiments of the invention make it possible to provide transparency to the user (controller or technical supervisor) and to identify the input data that explain an anomaly.

Other features, details and advantages of the invention will become apparent from reading the description, which is given with reference to the appended drawings, which are given by way of example and in which, respectively:

BRIEF DESCRIPTION OF THE DRAWINGS

Other features, details and advantages of the invention will become apparent from reading the description, which is given with reference to the appended drawings, which are given by way of example and in which, respectively.

DETAILED DESCRIPTION

The embodiments of the invention provide a method for supervising an air traffic tracking system in a current situation defined by the position and the speed vector of at least one aircraft based on data generated in real time by one or more sensors.

The embodiments of the invention may be used in air traffic control systems to aid the supervision of air traffic tracking systems, aircraft collision avoidance, and air traffic management.

According to the embodiments of the invention, an aircraft may be any type of aircraft such as an airplane (airliner, military airplane, private airplane), a helicopter, a hot air balloon or a drone.

According to some embodiments, a sensor used in the tracking system may be a terrestrial, surface or aerial sensor, such as:
  an air traffic control radar (for example a primary radar or a secondary radar);
  a multilateration system (using for example long-distance multilateration technology or else Wide Area Multilateration or WAM) formed of multiple beacons that receive the signals emitted by the transponder of an aircraft in order to locate it;
  an ADS-C system (acronym for "Automatic Dependent Surveillance-Contract") in which an aircraft uses its navigation systems to automatically determine and transmit its position to a processing center, or
  an ADS-B system (acronym for "Automatic Dependent Surveillance-Broadcast") in which an aircraft uses its navigation systems to automatically determine and broadcast its position along with other information such as speed and flight sign.

As used here, a given configuration corresponds to a first configuration in which the at least one aircraft is cruising or to a second configuration in which the at least one aircraft is approaching a given airport associated with a given positioning of one or more sensors and with a given type of weather encountered for the given airport.

As used here, a given situation is defined by the position and the speed vector relating to at least one aircraft and is represented by performance indicator values evaluating the normality of operation and the quality of service of the tracking system in the given situation.

Figure 1:
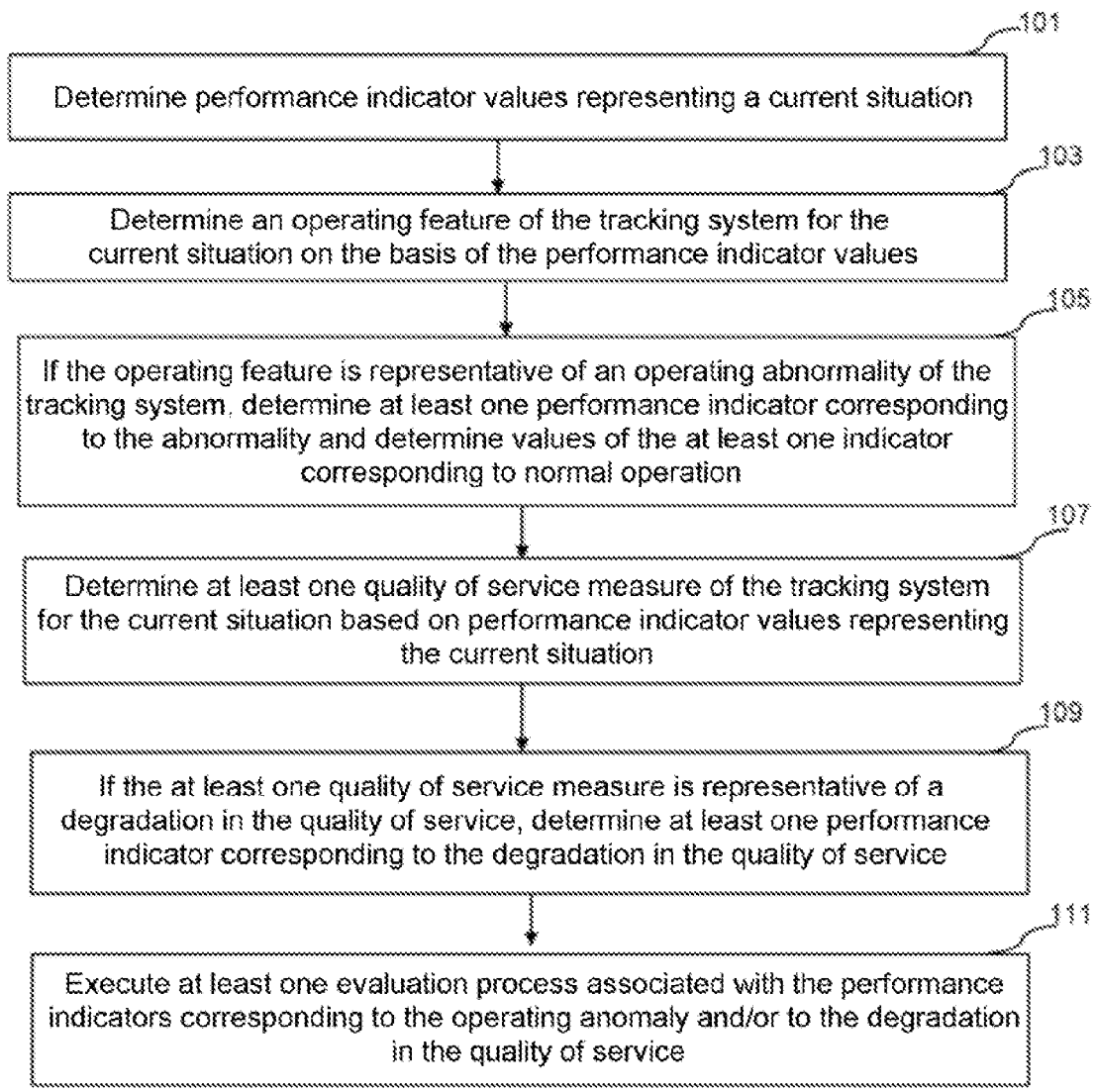
FIG. 1 is a flowchart showing a method for supervising a tracking system, according to some embodiments of the invention.

With reference to FIG. 1, the embodiments of the invention provide a method for supervising a tracking system, making it possible to evaluate and explain the operating normality and the quality of service of a tracking system in a current situation, the current situation being defined by the position and the speed vector relating to at least one aircraft moving in an airspace.

According to some embodiments, the position and the speed vector relating to at least one aircraft may be determined or estimated beforehand based on data from one or more sensors implemented in the tracking system by using a tracking algorithm.

According to some embodiments, the tracking algorithm may be a Kalman filter, according to various variants. The Kalman filter makes it possible to determine the position, the speed and the acceleration of the aircraft by estimating its position iteratively. At each iteration, the Kalman filter estimates a position of the aircraft at the current time based on a set of positions observed at previous times corresponding to previous iterations. A correction step follows the estimation step in order to correct the predicted position using the current measurement.

According to some embodiments, the tracking algorithm may be parameterized beforehand on the basis of the given configuration, for example on the basis of the features of the sensors or the type of weather.

In step 101, performance indicator values representing the current situation may be determined. The performance indicator values may be determined over a sliding time window.

According to some embodiments, step 101 may comprise constructing a set $N=\{1, \ldots, n\}$ of performance indicators (also called "performance metrics") for the measure of the tracking quality of the tracking system.

According to some embodiments, a performance indicator may be chosen on the basis of the application of the tracking system in the field of aviation. Examples of performance indicators comprise, without limitation:
  the indicators or metrics used to generate single integrated air pictures;
  the quality of service indicators or metrics specified in the ESASSP standard;
  additional indicators comprising the percentage of aircraft that are tracked in the tracking system.

According to some embodiments, step 101 may comprise determining the reconstructed trajectory of at least one aircraft between the current time and the current time minus 1 hour 30 minutes using Q-Splines. Step 101 may furthermore comprise determining the values of the metrics or performance indicators by integrating measures between the current time minus 15 minutes and the current time minus 1 hour 15 minutes.

In step 103, an operating feature (also called "normality state") of the tracking system for the current situation may be determined on the basis of the performance indicator values determined in step 101. The aim of step 103 is to identify the state of the normality of the current situation represented by the performance indicator values determined in step 101. Step 103 makes it possible to assign, to the current situation represented by a vector of n performance indicator values $x=(x_1, x_2, \ldots, x_n)$, a label or a normality class denoted $\eta(x)$ quantifying its normality state or operating state, $\eta(.)$ denoting a normality classifier and corresponding to a function that, to an instance $x=(x_1, x_2, \ldots, x_n)$, returns the normality class $\eta(x)$.

According to some embodiments, the operating feature may be a state chosen from a group comprising a normal operating state (or normal state), at least one known abnormal operating state (or else q 1 known abnormal operating states), an unknown abnormal operating state, and an impossible operating state, the operating feature being associated with an operating abnormality of the tracking system if the operating feature is not a normal operating state. The normal operating state corresponds to normal values of the performance indicators and to standard situations stored in a given configuration and for which the tracking system operates normally with correctly parameterized tracking and no problem identified on the sensors of the tracking system. Each known abnormal operating state is predefined and corresponds to an abnormal situation identified and defined by an expert in the field. The impossible abnormal operating state corresponds to impossible combinations of the performance indicator values, that is to say incompatible values on the indicators. The unknown abnormal operating state corresponds to other situations that are a priori possible and abnormal, although it is impossible to identify the situations to which they correspond.

The performance indicator values may be represented by points in a multidimensional space of performance indicator values and may be separated or grouped into various partitions.

Thus, step 101 may comprise partitioning the space of the performance indicator values into a plurality of areas comprising at least one normality area and at least one known abnormality area, each area of the plurality of areas representing a normality class and being associated with an operating state of the tracking system such that the at least one normality area is associated with the normal operating state and each of the known abnormality areas is associated with a known abnormal operating state from among the q previously identified known abnormal operating states. An operating state may be associated with multiple normality areas. The known abnormality areas may be non-disjoint and the normality area must not intersect an abnormality area.

The partitioned areas may furthermore comprise an area associated with the impossible operating state and an area associated with the unknown abnormal operating state.

According to some embodiments, the partitioning of the space of the performance indicator values into areas may be based on both unsupervised and supervised machine learning techniques.

According to some embodiments, partitioning the space of the performance indicator values into areas may comprise determining the at least one normality area, based on unsupervised standard data corresponding to performance indicator values obtained in normal operating situations, by applying an unsupervised machine learning technique. Identifying the underlying structure of the points clouds representing the performance indicator values associated with these normal operating situations makes it possible to determine, within the space of the performance indicator values, at least one normality area representing only normal situations, to identify areas with a high density of normal situations that provide a high degree of certainty of normality in their vicinity, and to identify the anomalies, or rare points, that provide only a low degree of certainty with regard to the normality in their vicinity.

According to some embodiments, the unsupervised machine learning technique may be chosen from a group comprising linear dimensionality reduction techniques (for example principal component analysis), non-linear dimensionality reduction techniques (for example auto-encoders and variety learning), data partitioning techniques or "clustering" (for example hierarchical clustering algorithms and the "Density-based Spatial Clustering of Applications with Noise" or DBSCAN algorithm), and kernel methods (for example kernel clustering and the kernel PCA method).

According to some embodiments, the standard data that are generated may be used to determine at least one known abnormality area in the space of the performance indicator values.

Thus, according to some embodiments, step 101 may comprise determining a set of data based on the generated standard data and partitioning the set of data into subsets by applying a supervised learning method, each subset corresponding to performance indicator values representing a known abnormality area. More specifically, determining the set of data may consist in modifying the standard data through transformations such that the set of data corresponds to values of the known abnormal performance indicators. Based on the a priori knowledge of the causes able to generate such abnormal performance indicator values (for example solar flares, frozen radomes, or incorrect parameterization of the sensors of the tracking system) and on the knowledge of the interference leading to such values, the standard data transformations may consist in applying interference sources similar to said interference.

According to some embodiments, the supervised learning method may be a data classification method that makes it possible to identify the underlying structures of each of the sets of situations corresponding to the same known abnormality state.

According to some embodiments, an uncertainty indicator may be associated with the supervised learning method in order to quantify the uncertainty of the outputs generated by the learning method.

According to some embodiments, the determination of at least one normality area may be based on a set of performance indicator vectors retrieved from data flows generated by the system in a nominal situation corresponding to correctly set tracking and to no incident. The set of performance indicator vectors may first be processed by applying a dimensionality reduction using an auto-encoder, and then classified using a single-class classification algorithm.

According to some embodiments, a plurality of known abnormal operating states may be identified over the service life of the tracking system, comprising an incorrect calibration abnormal operating state and a solar irruption abnormal operating state. The determination of the known abnormality areas corresponding to this plurality of known abnormal operating states may be based on transforming standard data corresponding to normal operating states. For example, to determine the known abnormal operating area corresponding to the incorrect calibration abnormal operating state, the vector of performance indicator values produced by the tracking system in the tracking calibration phase may be transformed by reducing the tracking parameter values. The tracking calibrations may be subjected to interference for each sensor used in the tracking system.

In step 105, the operating abnormality of the tracking system may be explained if the operating feature determined in step 103 is representative of an operating abnormality of the tracking system. The explanation may take various forms to explain why the operating state of the tracking system is not normal. In particular, step 105 may comprise determining at least one performance indicator corresponding to the operating abnormality and determining performance indicator values corresponding to normal operation.

Thus, according to some embodiments, step 105 may be based on a counter-factual explanation method that consists in identifying the list of performance indicators explaining that the operating state is not normal and in identifying the minimum modification to the performance indicators in the identified list that would make it possible to return the operating feature of the system as determined in step 103 to a normal operating state. The explanation method makes it possible, for a current situation represented by a vector $x=(x_1, \ldots, x_n)$ of performance indicator values and a normality class $\eta(x)$ indicating an operating state other than the normal state, to explain why the current situation does not correspond to the normal state.

According to some embodiments, the explanation method may consist in determining the vector $\hat{y}=(\hat{y}_1, \ldots, \hat{y}_n)$ of performance indicator values corresponding to a normality class $\eta(\hat{y})$ indicating a normal operating state of the tracking system, which is closest to the vector $x=(x_1, \ldots, x_n)$ by solving the optimization problem given by:

$$\hat{y} = \operatorname{argmin}_y \max_t t \times (\eta(y)-c)^2 + d(x, y),$$

with $d(x, y)$ designating a distance metric between the vectors x and y. The first term $t \times (\eta(y)-c)^2$ takes account of the fact that the new instance y is of the class c indicating a normal operating state and the second term $d(x, y)$ takes account of the fact that the new instance y is as close as possible to the vector x.

According to some embodiments, the distance metric between the vectors x and y may be chosen from a group comprising the Euclidean distance and the distance associated with the L1 norm.

According to some embodiments, the level of influence of each indicator in the comparison between the vector $x=(x_1, \ldots, x_n)$ and the vector $\hat{y}=(\hat{y}_1, \ldots, \hat{y}_n)$ may be determined using the Shapley value.

In step 107, at least one quality of service measure of the tracking system for the current situation may be determined based on the performance indicator values representing the current situation and determined in step 101. The quality of service measure may be implemented on the overall level on the multi-sensor tracking or on a local level for a particular sensor.

A quality of service measure may thus correspond to multi-sensor tracking corresponding to the overall tracking quality for a plurality of sensors or to single-sensor tracking corresponding to the quality of service for a given sensor.

According to some embodiments, the quality of service measure may be a monotonic function $Q(.)$ that returns a real number $Q(x)$ designating a quality of service measure and indicating the level of the quality of service, based on the vector $x=(x_1, \ldots, x_n)$ of the n performance indicator values.

According to some embodiments, a quality of service measure may be determined on the basis of the normality class $\eta(x)$ corresponding to the operating feature of the tracking system for the current situation and to the vector $x=(x_1, \ldots, x_n)$ of the n performance indicator values. According to these embodiments, the function $Q_{\eta(x)}(.)$ may be indexed by the normality class $\eta(x)$, a distinct computational model corresponding to a distinct function being used for the various normality classes, and the sole argument of the function $Q_{\eta(x)}(.)$ being the vector $x=(x_1, \ldots, x_n)$ of the n performance indicator values.

According to some embodiments, the normality class may be used as an attribute of the quality of service model, in addition to the vector of performance indicators. In these embodiments, the quality of service model may be a function $Q(\eta(x),x)$ having, as arguments, the vector $x=(x_1, \ldots, x_n)$ of the n performance indicator values and the normality class $\eta(x)$ corresponding to the vector x.

According to some embodiments, a plurality of quality of service measures may be determined, the plurality of quality of service measures comprising a measure of the multi-sensor overall tracking quality, and a measure of the quality of the single-sensor tracking for each type of sensor (radar, WAM, ADS-B).

According to some embodiments, a quality of service model may be determined for the multi-sensor tracking, a quality of service model may be determined for each radar or group of radars, a quality of service model may be determined for the WAM information, and a quality of service model may be determined for the ADS-B information, various performance metrics being used for each quality of service model.

For example, for multi-sensor tracking, the metrics from the ESASSP standard may be used, also considering the mandatory and recommended requirements of the ESASSP standard. For the secondary radar model, a plurality of performance indicators and requirements may be used, comprising a "range bias" indicator value below 100 m, an "azimuth bias" indicator value below 0.1, a "range standard deviation" indicator value below 70 m, an "azimuth standard deviation" indicator value below 0.1, a "maximum delay on a report of a target" indicator value below 2 seconds, a "red herring ratio" indicator value below 0.1%, and a "probability of detection" indicator value above 70%. For the WAM model, a plurality of indicators and mandatory requirements from the ESASSP standard may be used, comprising a "horizontal RMS position error" indicator value lower than 350 m in ER and lower than 150 m in TMA, a "processing delay" indicator value less than 1 second in "Data Driven" mode and less than 1 second plus the output period in "periodic delayed" mode and less than 0.5 seconds for "periodically predicted period" mode, a "probability of detection of the position" indicator value greater than 97%, and a "red herring ratio" indicator value less than 0.1%.

According to some embodiments, a set A of performance indicators may correspond to statistics regarding events for which the performance indicator values comprise at least one value not able to be computed over the current time window. In these embodiments, the vector $x=(x_1, \ldots, x_n)$ may comprise values only on the set $N=\{1, \ldots, n\}\backslash A$ and have missing values in association with the performance indicators of the set A. The vector $x_{N\backslash A}$ designates the vector comprising performance indicators values on the set $N\backslash A$.

According to some embodiments, the determination of the quality of service measure in the presence of missing performance indicator values may be carried out using a first approach that consists in supplementing the vector $x_{N\backslash A}$ with the missing values $z_A$ for the indicators of the set A that are most unfavorable for the vector x and determining the quality of service measure $Q(x_{N\backslash A}, z_A)$ based on the vectors $x_{N\backslash A}$ and the vector $z_A$.

According to some embodiments, the determination of the quality of service measure in the presence of missing performance indicator values may be carried out using a second approach that is based on the a priori probability on the missing values and evaluating the expectation of the quality of service measure $Q(x_{N\backslash A}, z_A)$ according to the probability on $z_A$.

According to some embodiments, the determination of the quality of service measure in the presence of missing performance indicator values may be carried out using a third approach that is based on determining a new quality of service function $Q_{-A}(x_{N\backslash A})$ from the function $Q(.)$ based on properties dependent on the function $Q(.)$. In particular, the function Q(.) may be a general function or a monotonic and normalized function, or a function using a Choquet integral.

The Choquet integral is an aggregation function $C_\mu: \mathbb{R}^n \to \mathbb{R}$ having a vector $\mu: 2^N \to [0,1]$ as parameter. For $S \subseteq N$, $\mu(S)$ represents the importance of the criteria S. The quality of service model may be written in the form $Q(x)=F(u_1(x_1), \ldots, u_n(x_n))$, where $F=C_\mu$ is the aggregation function and $\mu_i: Y_i \to \mathbb{R}$ is the (normalization) utility function on the indicator i, $Y_i$ designating the set of values that the indicator i may take. This aggregation function F is monotonic and normalized. The utility functions are themselves normalized and satisfy $u_i(\perp_i)=0$, $u_i(T_i)=1$. Thus, $C_\mu(0, \ldots, 0)=0$ and $C_\mu(1, \ldots, 1)=1$. The Choquet integral additionally satisfies an idempotent property that indicates that $C_\mu(t, \ldots, t)=t$.

According to the embodiments using a general function Q(.) and considering indicators taking discrete values, the new function $Q_{-A}(x_{N\backslash A})$ may be given by:

$$Q_{-A}(x_{N\backslash A}) = \frac{1}{\prod_{i \in A} |Y_i|} \sum_{z_A \in Y_A} Q(x_{N\backslash A}, z_A).$$

The sum may be replaced by an integral when the indicators take continuous values.

According to some embodiments using a function Q(.) that is monotonic with respect to the performance indicators and normalized and indicators taking discrete values, the new function $Q_{-A}(x_{N\backslash A})$ may be given by:

$$Q_{-A}(x_{N\backslash A}) = \frac{\sum_{z_A \in Y_A} (Q(x_{N\backslash A}, z_A) - Q(\perp_{N\backslash A}, z_A))}{\sum_{z_A \in Y_A} (Q(T_{N\backslash A}, z_A) - Q(\perp_{N\backslash A}, z_A))},$$

with $T_{N\backslash A}$ designating a most preferred element for the attribute N\A and $\perp_{N\backslash A}$ designating a least preferred element for the attribute N\A. The sum may be replaced by an integral when the indicators take continuous values.

In some embodiments in which the function Q(.) uses a Choquet integral, the new function $Q_{-A}(x_{N\backslash A})$ may be given by: $Q_{-A}(x_{N\backslash A})=F_{-A}(u_i(x_i), i \in N\backslash A)$, with $$F_{-A}(d_{N\backslash A}) = \frac{G_{-A}(d_{N\backslash A}) - G_{-A}(0_{N\backslash A})}{G_{-A}(1_{N\backslash A}) - G_{-A}(0_{N\backslash A})} \text{ and}$$

$$G_{-A}(d_{N\backslash A}) = \sum_{B \subseteq A} C_\mu(d_{N\backslash A}, 1_B, 0_{A\backslash B}).$$

The Choquet integral makes it possible to model the criteria that interact with one another. One specific case consists in drawing a limit at interactions only between pairs of criteria. The expression of the Choquet integral—then called 2-additive Choquet integral—is given by $$C_\mu(x_1, \ldots, x_n) = \sum_{i \in N} v_i x_i + \sum_{(i,j) \subseteq N} I_{i,j} \frac{|x_i - x_j|}{2},$$

with $v_i$ designating the importance of the criterion i, and $I_{i,j}$ designating the level of interaction between the criteria i and j. For this model, the new function $Q_{-A}$ may be written in the form: $Q_{-A}(x_{N\backslash A})=F_{-A}(u_i(x_i), i \in N\backslash A)$, where $F_{-A}$ designates a 2-additive Choquet integral with the importance and interaction coefficients given by $$v_i^{N\backslash A} = \frac{v_i}{\sum_{k \in N\backslash A} v_k} \text{ and } I_{i,j}^{N\backslash A} = \frac{I_{i,j}}{\sum_{k \in N\backslash A} v_k},$$

with $v_i$ and $I_{i,j}$ designating the importance and interaction indices of the Choquet integral $C_\mu$ defined on the set N of criteria.

According to some embodiments in which the number of indicators is high, the aggregation function may be organized hierarchically.

According to some embodiments, the hierarchical decomposition of the aggregation function may be formed of multiple Choquet integrals. The restriction operators may thus be applied to each Choquet integral.

According to some embodiments, a normalization and aggregation criteria tree may be determined for each quality of service model. The mandatory and recommended requirements may be separated and piecewise affine utility functions and a Choquet integral may be used for the aggregations.

According to some embodiments, the tracking system may be used to track at least one aircraft in an airspace divided into a plurality of spatial areas, the tracking quality being able to be evaluated on each spatial area separately in order to identify the area in which the quality of service is degraded or an operating problem has occurred. In these embodiments, at least one quality of service measure of the tracking system may be determined in step 107 in association with each of the plurality of spatial areas.

According to some embodiments, the determination of quality of service measures over a plurality of spatial areas may be based on a uniform paving of the airspace into a plurality of cells defined by the ESASSP standard, the cells being grouped together such that air traffic is homogeneous from one group of cells to another.

According to the embodiments of the invention, the determination of the groups of cells may be based on a method comprising the steps of:

determining an initial uniform paving of the airspace into uniform cells specified by the ESASSP standard, the number of measures being known for each of the cells of the initial paving;

determining two related groups of the set of cells by dividing the set of cells into two subsets such that the two groups or two subsets have a relatively identical total number of measures, the total number of measures corresponding to the sum of the number of measures on the cells forming each subset. This step is repeated on each of the two subsets by dividing each subset into two domains, and so on, until the number of measures in a domain reaches a given threshold. This step may advantageously be carried out by applying affine dividing of the set of cells.

According to some embodiments, the division of the sets of cells may be carried out dynamically upon each computation of a quality of service measure, the number of measures present in each cell changing over time.

In step 109, an explanation for the degradation in the quality of service of the tracking system may be determined if the at least one quality of service measure determined in step 107 is representative of a degradation in the quality of service, for example if at least one quality of service measure is lower than a predefined quality of service threshold. According to the embodiments of the invention, the explanation for the degradation in the quality of service consists in determining at least one performance indicator corresponding to the degradation in the quality of service and explaining the difference between the level of the quality of service corresponding to the current situation and to the vector $x=(x_1, \ldots, x_n)$ of the n performance indicator values representing the current situation and at least one quality of service level corresponding to a given situation. The given situation may for example represent a normal situation corresponding to a normal operating state of the tracking system and to a vector $y_{opt}=(y_{opt,1}, \ldots, y_{opt,n})$ of performance indicator values, or a catastrophic situation corresponding to an operating state of the tracking system in which all of the performance indicators have incorrect evaluations.

To determine which performance indicators correspond and explain the degradation in the quality of service for the current situation, a measure (also called "influence index"), denoted $I_i(x,y_{opt};T,Q)$, may be used to measure the influence of the indicator $i \in \{1, \ldots, n\}$ in the difference $Q(x)-Q(y_{opt})$ between the vector $x=(x_1, \ldots, x_n)$ of the n performance indicator values representing the current situation and the vector $y_{opt}=(y_{opt,1}, \ldots, y_{opt,n})$ of the n performance indicator values representing a normal situation, with $Q(.)$ representing the quality of service measure model organized in the form of a tree with respect to a tree denoted T, the performance indicators being organized hierarchically.

In order to distinguish the contribution of each indicator $i \in \{1, \ldots, n\}$ in the difference $Q(x)-Q(y_{opt})$, the influence index of the indicator $i \in \{1, \ldots, n\}$ may be determined based on partial influence indices denoted $\delta_\pi^{x,y_{opt},T,Q}(i)$, each partial influence index $\delta_\pi^{x,y_{opt},T,Q}(i)$ being determined based on permuted vectors obtained by applying a permutation $\pi$ selected from the set $\pi(T)$ of compatible permutations in the tree T such that $\delta_\pi^{x,y_{opt},T,Q}(i):=A(y_{opt,S_\pi(i)}, x_{\wedge S_\pi(i)})-Q(y_{opt,S_\pi(i)\setminus\{i\}}, x_{(\wedge S_\pi(i))\cup\{i\}})$, with $S_\pi(\pi(k))=\{\pi(1), \ldots, \pi(k)\}$. The influence index of the indicator $i \in \{1, \ldots, n\}$ may thus be determined as the average of the partial indicator indices over all of the permutations $\pi$ of the set $\pi(T)$ such that $$I_i(x, y_{opt}; T, Q) = \frac{1}{|\prod(T)|} \sum_{\pi \in \prod(T)} \delta_\pi^{x,y_{opt},T,Q}(i).$$

In some embodiments in which the vector x of performance indicator values representing the current situation comprises missing values, the influence index of an indicator $i \in \{1, \ldots, n\}$ may be determined by first determining the missing values.

According to some embodiments in which the vector x of performance indicator values representing the current situation comprises missing values, the influence index of an indicator $i \in \{1, \ldots, n\}$ may be determined based on a definition of the influence of the indicator i by $$I_i(x; T, Q) = \frac{1}{|\prod(T)|} \sum_{\pi \in \prod(T)} \Delta_\pi^{x,T,Q}(i),$$

with $\Delta_\pi^{x,T,Q}(i) = Q_{-N\setminus S_\pi(i)}(x_{S_\pi(i)}) - Q_{-N\setminus(S_\pi(i)\setminus\{i\})}(x_{S_\pi(i)\setminus\{i\}})$ and $Q_\emptyset(x_\emptyset)=0$, based on the restriction operator on the missing values.

According to some embodiments, the computations carried out for determining the influence indices of the performance indicators may use compensated sum algorithms rather than standard summing operators.

According to some embodiments, each performance indicator may be associated with a set of executable evaluation processes (set of emergency procedures) making it possible to evaluate the state of a subsystem of the tracking system and to identify the origin of potential operating anomalies of the tracking system.

In step 111, the evaluation processes (in the form of emergency procedures for identifying the root causes) associated with the performance indicators corresponding to an operating abnormality and/or to a degradation in the quality of service may be determined and executed by the maintenance operator of the tracking system. More specifically, step 111 may comprise determining or identifying, and executing the most relevant emergency procedures associated with the performance indicators explaining the operating abnormality of the tracking system in the current situation and the most relevant emergency procedures associated with the performance indicators explaining the degradation in the quality of service of the tracking system in the current situation.

According to some embodiments, step 111 may consist in identifying and executing the emergency procedures associated with the performance indicators corresponding to values for the current situation that are significantly different from the values for the counter-factual example under consideration.

According to some embodiments, step 111 may comprise a sub-step of comparing the results obtained on the various quality of service models comprising the model used for multi-sensor tracking and the models used for each type of sensor for single-sensor tracking. Step 111 may furthermore comprise a sub-step of identifying the indicators having the greatest influence on the degradation in the quality of service from among the indicators of the various models under comparison, and of selecting a number of indicators, this number of indicators being determined either by retaining the indicators that are associated with the p largest influence indices or by applying a clustering algorithm to the distribution of the influence indices and by selecting the indicators in the first class. Selecting the performance indicators by applying the clustering algorithm advantageously makes it possible to select the performance indicators dynamically on the basis of the distribution of the values.

According to some embodiments, step 111 may consist in collecting all of the influence levels of each indicator by including the various quality of service models, in classifying the indicators according to the sum of the influence levels they have, and in executing the emergency procedures associated with these indicators in the order of classification of the indicators.

The invention also provides a device for supervising an air traffic tracking system, in a current situation of the tracking system as defined by a position and a speed vector relating to at least one aircraft, the position and the speed vector being determined based on data from one or more sensors, the device being configured to determine performance indicator values representing the current situation, characterized in that the device is configured to:
  determine an operating feature of the tracking system for said current situation on the basis of said performance indicator values;
  if said operating feature is representative of an operating abnormality of the tracking system, determine at least one performance indicator corresponding to the operating abnormality, and determine values of at least one performance indicator corresponding to normal operation;

determine at least one quality of service measure of the tracking system for the current situation based on the performance indicator values representing the current situation;

if the at least one quality of service measure is representative of a degradation in the quality of service, determine at least one performance indicator corresponding to the degradation in the quality of service;

execute at least one evaluation process associated with the at least one performance indicator corresponding to the operating abnormality and/or to said degradation in the quality of service.

The invention also provides a computer program product comprising code instructions for performing the steps of the method when said program is executed on a computer.

The embodiments of the invention may be implemented by various means, for example by hardware, software, or a combination thereof.

Figure 2:
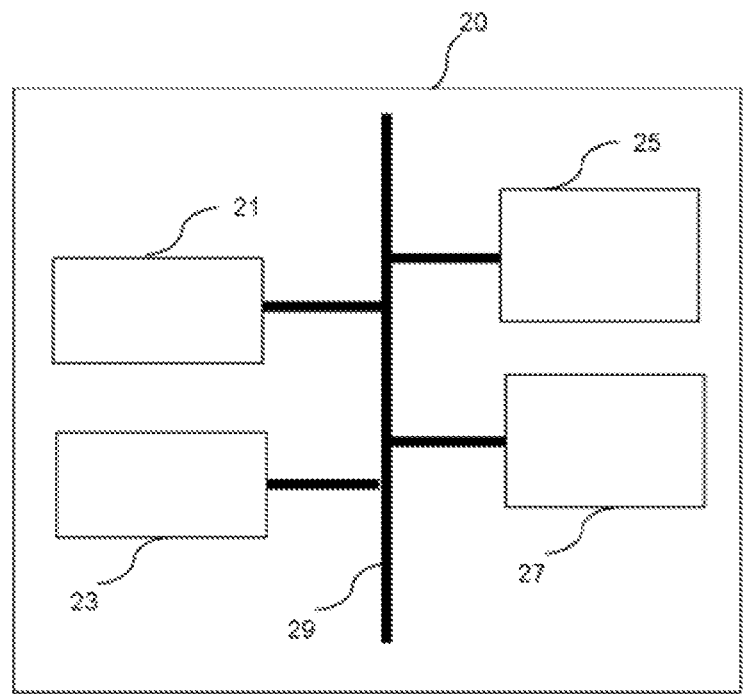
FIG. 2 is a schematic view of an exemplary computerized system for implementing the method for supervising a tracking system, according to some embodiments of the invention.

The method, device and computer program product for supervising and evaluating a tracking system according to the various embodiments of the invention may be implemented on one or more computerized devices or systems, referred to collectively by the name computer, such as the computer 20 illustrated in FIG. 2. The computer 20 may include various computing, storage and communication units configured to interact with each other via a data and address port 29, comprising a processor 21, one or more storage peripherals 23, an input/output (I/O) interface 25 and a human-machine interface (HMI) 27.

The processor 21 may include one or more devices selected from: microprocessors, microcontrollers, digital signal processors, microcomputers, central processing units, programmable gate arrays, programmable logic devices, finite-state machines, logic circuits, analog circuits, digital circuits or any other device used to handle (analog or digital) signals based on operating instructions stored in the memory. The memory may include a single memory device or a plurality of memory devices, notably, but not being limited to, read-only memory (ROM), random-access memory (RAM), volatile memory, non-volatile memory, static random-access memory (SRAM), dynamic random-access memory (DRAM), flash memory, cache memory or any other device capable of storing information. The mass memory device may include data storage devices such as a hard drive, an optical disk, a magnetic tape drive, a volatile or non-volatile solid-state circuit or any other device capable of storing information. A database may reside on the mass memory storage device and may be used to collect and organize the data used by the various systems and modules described here.

The processor 21 may operate under the control of an operating system that resides in the memory. The operating system may manage computing resources such as the computer program code, integrated in the form of one or more software applications.

In general, the routines executed to implement the embodiments of the invention, whether they are implemented in the context of an operating system or a specific application, a component, a program, an object, a module or a sequence of instructions, or even a subset thereof, may be referred to here as "computer program code" or just "program code". The program code typically comprises computer-readable instructions which reside at various times in various memory and storage devices in a computer and which, when they are read and executed by one or more processors in a computer, cause the computer to perform the operations required to execute the operations and/or the elements specific to the various aspects of the embodiments of the invention. The computer-readable instructions of a program for performing the operations of the embodiments of the invention may be, for example, the assembly language, or else a source code or an object code written in combination with one or more programming languages.

The invention claimed is:

1. A method for supervising an air traffic tracking system, in a current situation of the tracking system as defined by a real-time situation of a position and a speed vector relating to at least one aircraft, said position and said speed vector being determined based on data from one or more sensors, the method comprising:

a step of determining with a computer performance indicator values representing said current situation, the method further comprising the steps of:

determining with the computer an operating feature of the tracking system for said current situation on a basis of said performance indicator values;

if said operating feature is representative of an operating abnormality of said tracking system, determining with the computer at least one performance indicator corresponding to said operating abnormality, and determining values of said at least one performance indicator corresponding to normal operation;

determining with the computer at least one quality of service measure of the tracking system for said current situation based on the performance indicator values representing said current situation;

if said at least one quality of service measure is representative of a degradation in the quality of service, determining with the computer at least one performance indicator corresponding to said degradation in the quality of service; and executing with the computer at least one evaluation process associated with said at least one performance indicator corresponding to said operating abnormality and/or to said degradation in the quality of service, wherein the at least one evaluation process comprises determining or identifying emergency procedures for execution by a maintenance operator.

2. The method as claimed in claim 1, further comprising implementing the computer with a processor, one or more storage peripherals, an input/output (I/O) interface, and/or a human-machine interface (HMI), wherein said operating feature is a state chosen from the group comprising a normal operating state, at least one known abnormal operating state, an unknown abnormal operating state, and an impossible operating state, and wherein said operating feature being associated with an operating abnormality of said tracking system if said operating feature is not a normal operating state.

3. The method as claimed in claim 2, wherein said normal operating state corresponds to a known situation for a given configuration, said given configuration corresponding to a first configuration wherein said at least one aircraft is cruising or to a second configuration wherein said at least one aircraft is approaching a given airport associated with a given positioning of one or more sensors and with a given type of weather for said given airport, said at least one known abnormal operating state being predefined, and wherein said impossible operating state corresponding to impossible combinations of the performance indicator values.

4. The method as claimed in claim 2,
wherein the step of determining performance indicator values representing said current situation comprises partitioning a space of the performance indicator values into a plurality of areas comprising at least one normality area and at least one known abnormality area, each area of said plurality of areas representing a normality class and being associated with an operating state of said tracking system, said at least one normality area being associated with said normal operating state, and wherein each of said at least one known abnormality areas being associated with a known abnormal operating state.

5. The method as claimed in claim 4, wherein partitioning the space of the performance indicator values comprises determining said at least one normality area, based on standard data corresponding to performance indicator values obtained in normal operating situations, by applying an unsupervised machine learning technique.

6. The method as claimed in claim 5, wherein said unsupervised machine learning technique is chosen from a group comprising linear dimensionality reduction techniques, non-linear dimensionality reduction techniques, partitioning techniques and kernel methods.

7. The method as claimed in claim 5, wherein the step of determining performance indicator values representing said current situation comprises determining a set of data based on said standard data and partitioning said set of data into subsets by applying a supervised learning method, each subset corresponding to performance indicator values representing a known abnormality area.

8. The method as claimed in claim 7, wherein said supervised learning method is a data classification method.

9. The method as claimed in claim 1, wherein a quality of service measure corresponds to multi-sensor tracking or single-sensor tracking, said quality of service measure corresponding to an overall tracking quality for a plurality of sensors for multi-sensor tracking, and to the tracking quality for a given sensor for single-sensor tracking.

10. The method as claimed in claim 1, wherein said performance indicator values for the current situation are contained within a normality class corresponding to said operating feature of the tracking system for said current situation, a quality of service measure of said tracking system being determined on the basis of said normality class.

11. The method as claimed in claim 1, wherein said tracking system is used to track said at least one aircraft in an airspace divided into a plurality of spatial areas, a quality of service measure of said tracking system being determined in association with each of the plurality of spatial areas.

12. The method as claimed in claim 1, wherein the performance indicator values have at least one missing value, a quality of service measure of said tracking system being determined in a presence of at least one missing performance indicator value.

13. The method as claimed in claim 1, wherein the step of determining said at least one performance indicator corresponding to said degradation in the quality of service comprises determining an influence indicator associated with each performance indicator.

14. The method as claimed in claim 1, wherein each performance indicator is associated with a set of executable evaluation processes for evaluating a state of a subsystem of said tracking system, the step of executing at least one evaluation process comprising executing the evaluation processes associated with said at least one performance indicator corresponding to said operating abnormality of said tracking system and/or with said at least one performance indicator corresponding to said degradation in the quality of service.

15. A device for supervising an air traffic tracking system, in a current situation of the air traffic tracking system as defined by a real-time situation of a position and a speed vector relating to at least one aircraft, said position and said speed vector being determined based on data from one or more sensors, the device being configured to determine performance indicator values representing said current situation, wherein the device comprises:

a computer configured to determine an operating feature of the air traffic tracking system for said current situation on the basis of said performance indicator values;

if said operating feature is representative of an operating abnormality of said air traffic tracking system, the computer being further configured to determine at least one performance indicator corresponding to said operating abnormality, and determine values of said at least one performance indicator corresponding to normal operation;

the computer being further configured to determine at least one quality of service measure of the air traffic tracking system for said current situation based on the performance indicator values representing said current situation;

if said at least one quality of service measure is representative of a degradation in the quality of service, the computer being further configured to determine at least one performance indicator corresponding to said degradation in the quality of service; and the computer being further configured to execute at least one evaluation process associated with said at least one performance indicator corresponding to said operating abnormality and/or to said degradation in the quality of service, wherein the at least one evaluation process comprises determining or identifying emergency procedures for execution by a maintenance operator.

16. A non-transitory computer program product comprising instructions when executed on a computer for implementing a method for supervising an air traffic tracking system, in a current situation of the tracking system as defined by a real-time situation of a position and a speed vector relating to at least one aircraft, said position and said speed vector being determined based on data from one or more sensors, the instructions of the non-transitory computer program product comprising a step of:

determining with the computer performance indicator values representing said current situation, the method further comprising the steps of:

determining with the computer an operating feature of the tracking system for said current situation on a basis of said performance indicator values;

if said operating feature is representative of an operating abnormality of said tracking system, determining with the computer at least one performance indicator corresponding to said operating abnormality, and determining values of said at least one performance indicator corresponding to normal operation;

determining with the computer at least one quality of service measure of the tracking system for said current situation based on the performance indicator values representing said current situation;

if said at least one quality of service measure is representative of a degradation in the quality of service, determining with the computer at least one performance indicator corresponding to said degradation in the quality of service; and
executing with the computer at least one evaluation process associated with said at least one performance indicator corresponding to said operating abnormality and/or to said degradation in the quality of service,
wherein the at least one evaluation process comprises determining or identifying emergency procedures for execution by a maintenance operator.

* * * * *